United States Patent
Chancey et al.

(10) Patent No.: US 9,329,841 B2
(45) Date of Patent: May 3, 2016

(54) SOFTWARE ASSET PACKAGING AND CONSUMPTION

(75) Inventors: Raphael P. Chancey, Leander, TX (US); Lei He, Beijing (CN); Eduardo T. Kahan, Longwood, FL (US); Dong Bing Li, Beijing (CN); Chen Tian, Beijing (CN); Chang He Weng, Beijing (CN); Yong Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 709 days.

(21) Appl. No.: 12/827,085

(22) Filed: Jun. 30, 2010

(65) Prior Publication Data

US 2010/0333083 A1    Dec. 30, 2010

(30) Foreign Application Priority Data

Jun. 30, 2009    (CN) .......................... 2009 1 0139814

(51) Int. Cl.
*G06F 9/44* (2006.01)

(52) U.S. Cl.
CPC ... *G06F 8/36* (2013.01); *G06F 8/20* (2013.01); *G06F 8/35* (2013.01)

(58) Field of Classification Search
None
See application file for complete search history.

(56) References Cited

U.S. PATENT DOCUMENTS

| | | | |
|---|---|---|---|
| 6,226,792 B1 * | 5/2001 | Goiffon et al. | 717/120 |
| 6,268,853 B1 * | 7/2001 | Hoskins et al. | 700/83 |
| 6,370,681 B1 * | 4/2002 | Dellarocas et al. | 717/110 |
| 6,442,748 B1 * | 8/2002 | Bowman-Amuah | G06F 8/20 707/999.009 |
| 6,543,046 B1 * | 4/2003 | Lunt | 717/105 |
| 6,618,856 B2 | 9/2003 | Coburn et al. | |
| 6,640,249 B1 * | 10/2003 | Bowman-Amuah | G06F 8/38 709/228 |
| 6,662,357 B1 * | 12/2003 | Bowman-Amuah | G06F 8/20 717/120 |
| 6,715,145 B1 * | 3/2004 | Bowman-Amuah | G06F 8/20 718/100 |

(Continued)

FOREIGN PATENT DOCUMENTS

| | | |
|---|---|---|
| CN | 1488112 A | 4/2004 |
| CN | 1503944 A | 6/2004 |
| WO | 2007001108 A1 | 1/2007 |

OTHER PUBLICATIONS

Grant Larson et al., "Asset lifecycle management for service-oriented architectures", IBM, 2005, <http://www.ibm.com/developerworks/rational/library/oct05/wilber/>, pp. 1-15.*

(Continued)

*Primary Examiner* — Thuy Dao
*Assistant Examiner* — Samuel Hayim
(74) *Attorney, Agent, or Firm* — Yee & Associates, P.C.; Parashos Kalaitzis

(57) ABSTRACT

A reusable asset packaging and consumption method and system that support consumption activities and variability point instances associated with asset types or artifact types. Generic consumption activities and variability point types for different asset types or artifact types and developed and stored in a repository. When an asset packager packages an asset, a needed activity is selected from the activities associated with the type of the asset. The activity, a variability point instance bound with the activity, and the context constraints, together with the artifacts is packaged into the asset package, where the asset package is then stored in a repository. During consumption, the asset consumer obtains the asset package, verifies the context, and executes the activity packaged in the asset, while specifying variability point values for the bound variability instance.

21 Claims, 8 Drawing Sheets

(56) References Cited

U.S. PATENT DOCUMENTS

| | | | |
|---|---|---|---|
| 6,742,015 B1 * | 5/2004 | Bowman-Amuah | G06F 8/20 709/223 |
| 6,948,115 B2 | 9/2005 | Aizikowitz et al. | |
| 7,096,504 B1 * | 8/2006 | Tagawa et al. | 726/27 |
| 7,149,734 B2 * | 12/2006 | Carlson et al. | |
| 7,444,620 B2 * | 10/2008 | Marvin | G06F 8/36 717/116 |
| 7,505,990 B2 | 3/2009 | Krishna et al. | |
| 7,581,255 B2 | 8/2009 | Alkove et al. | |
| 7,721,250 B2 * | 5/2010 | Anand | G06F 8/20 717/100 |
| 7,774,697 B2 * | 8/2010 | Olander et al. | 715/234 |
| 7,802,227 B1 * | 9/2010 | Stienstra | G06F 8/36 717/101 |
| 7,823,120 B2 * | 10/2010 | Kazakov et al. | 717/104 |
| 7,895,563 B2 * | 2/2011 | Carlson et al. | 717/102 |
| 8,095,911 B2 * | 1/2012 | Ronen et al. | 717/122 |
| 8,131,606 B2 | 3/2012 | Bellacicco et al. | |
| 8,175,936 B2 * | 5/2012 | Ronen | G06F 8/36 705/26.7 |
| 8,412,813 B2 | 4/2013 | Carlson et al. | |
| 2001/0047365 A1 * | 11/2001 | Yonaitis | 707/200 |
| 2001/0047369 A1 * | 11/2001 | Aizikowitz et al. | 707/500 |
| 2002/0010776 A1 * | 1/2002 | Lerner | 709/225 |
| 2002/0038450 A1 * | 3/2002 | Kloppmann et al. | 717/102 |
| 2002/0120921 A1 * | 8/2002 | Coburn et al. | 717/140 |
| 2002/0138449 A1 * | 9/2002 | Kendall et al. | 705/75 |
| 2002/0156889 A1 * | 10/2002 | Crudele et al. | 709/224 |
| 2002/0157002 A1 * | 10/2002 | Messerges et al. | 713/155 |
| 2003/0037327 A1 * | 2/2003 | Cicciarelli et al. | 717/178 |
| 2003/0046282 A1 * | 3/2003 | Carlson et al. | 707/6 |
| 2004/0015833 A1 * | 1/2004 | Dellarocas et al. | 717/106 |
| 2005/0108134 A1 | 5/2005 | Harlow et al. | |
| 2006/0070063 A1 * | 3/2006 | Takashige et al. | 717/174 |
| 2006/0253490 A1 * | 11/2006 | Krishna et al. | 707/104.1 |
| 2006/0265688 A1 * | 11/2006 | Carlson et al. | 717/101 |
| 2007/0033567 A1 * | 2/2007 | Carlson et al. | 717/100 |
| 2007/0180424 A1 * | 8/2007 | Kazakov et al. | 717/104 |
| 2007/0266028 A1 * | 11/2007 | Muller et al. | 707/8 |
| 2008/0183514 A1 * | 7/2008 | Moulckers et al. | 705/7 |
| 2008/0195509 A1 * | 8/2008 | Bellacicco et al. | 705/28 |

OTHER PUBLICATIONS

Biplav Srivastava et al., "Enhancing Asset Search and Retrieval in a Services Repository using Consumption Contexts", IEEE, 2007, <http://ieeexplore.ieee.org/stamp/stamp.jsp?tp=&arnumber=4278673>, pp. 1-8.*

E deDoncker et al., "Parint: A Software Package for Parallel Integration", ACM, 1996, <http://delivery.acm.org/10.1145/240000/237597/p149-dedoncker.pdf>, pp. 1-8.*

"Reusable Asset Specification," Object Management Group (OMG) Available Specification, Version 2.2, Nov. 2005, 121 pages.

* cited by examiner

*FIG. 4*

```xml
<AllActivities>
    <artifactType id='1' name='WSDL' description='this is a wsdl file' suffix='.wsdl'>
        <!--judge artifactType only by suffix-->
        <activities>
            <activity id='0001'/> <!--referenced from activities defined below-->
            <activity id='0002'/>
        </activities>
    </artifactType>
    <artifactType id='2' name='Java file' description='this is a Java file' suffix='.Java' />
    <variabilityPointType id='001' artifactType='1' name="PortType" description='it is a portType' />
    <activityContext id='01' name='wid' product="WID" version="6.1" description=" " />
    <activityContext id='02' name='windows2000' product="OS" version="2000" description=" " />
    <activityContext id='03' name='fixpack001' product="widfixpack" version="1.0.3" description=" " />

<assetActivities>
        <activity id='0001' class=" com.ibm.ase.wid.unzipActivity" version='1.0' description=" ">
            <inputs>
                <activityParameter name="projectType" description=" " type=" String " />
                <activityParameter name="projectName" description=" " type=" org.eclipse.ISource" />
            </inputs>
            <output>
                <activityParameter name="projectRef" description=" " type="IProject" />
            </output>
            <contexts>
                <expression opeartor="AND">
                    <activitycontextref id='01'/>
                    <activitycontextref id='02'/>
                </expression>
            </contexts>
        </activity>
    </assetActivities>

<artifactActivities>
        <activity id='0002' class=" com.ibm.ase.wid.CreateMediationModule" version='1.0'>
            <activityParameter name='createMediationInput' defaultValue="Java" type="String" />
            <contexts>
                <expression opeartor="AND">
                    <activitycontextref id='01'/>
                    <expression operator="OR">
                        <activitycontextref id='01'/>
                        <activitycontextref id='02'/>
                    </expression>
                </expression>
            </contexts>
        </activity>
    </artifactActivities>

</AllActivities>
```

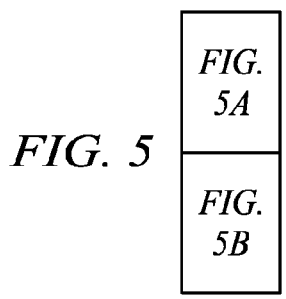

FIG. 5

```
<com.ibm.ram.rich.ui.extension.core.wsmodel:AssetFileObject xmi:version="2.0"
    xmlns:xmi="http://www.omg.org/XMI"
xmlns:com.ibm.ram.rich.ui.extension.core.wsmodel="http:///com/ibm/ram/rich/ui/extension/core/
wsmodel.ecore"
    modelVersion="1.0.1.0">
  <assetManifest name="BillASEAsset" id="{408720AA-AF0C-1B48-BC7E-9EFE456D01F6}"
date="2007-09-18" state="Approved"
    version="3.0" shortDescription="An asset for telcommunication bill ASE scenario.">
  <classification>
      ...
  </classification>
  <solution>
      ...

<artifact name="ServiceExport.wsdl" type="text/xml">
        <reference><referenceKind name="workspace"/><value>/BillASEDemo/
ServiceExport.wsdl</value></reference>
        <variabilityPoint name="WSDL.Operation_0" artifact="//@assetManifest/@solution/
@artifact.0/@artifact.14">
          <description><value><?xml version="1.0" encoding="ASCII"?>;
            <com.ibm.ram.rich.ui.extension.ase.core:ASEVariabilityPoint xmi:version="2.0"
xmlns:xmi="http://www.omg.org/XMI" xmlns:com.ibm.ram.rich.ui.extension.ase.core="http:///
com/ibm/ram/rich/ui/extension/ase/ase.ecore" name="WSDL.Operation_0" description="Internal
Service Operation" boundTo="//@variants.0"
vpTypeID="com.ibm.ram.rich.ui.extension.ase.activity.wid.wsdl.operation">
          <variants name="BillService"
description="com.ibm.ram.rich.ui.extension.ase.activity.wid.wsdl.portType">
            <variants name="get_Customer_Bill"
description="com.ibm.ram.rich.ui.extension.ase.activity.wid.wsdl.operation"/>
          </variants>
          ...
                              o
                              o
                              o
```

FIG. 5A

```
            o
            o
            o
        <ramVariabilityPoint href="#//@assetManifest/@solution/@artifact.0/@artifact.14/
@variabilityPoint.1"/>
        </com.ibm.ram.rich.ui.extension.ase.core:ASEVariabilityPoint></value>
      </description>
     </variabilityPoint>

...
   </artifact>
  </solution>
  <usage>
   <artifactActivity artifact="//@assetManifest/@solution/@artifact.0/@artifact.14">
     <activity task="createMFFromSingleWSDLUsingWTX"
taskType="com.ibm.ram.rich.ui.extension.ase.activity.wid.CreateMediationFlowPriWTX"
        artifact="//@assetManifest/@solution/@artifact.0/@artifact.14">
        <variabilityPointBinding bindingRule="Internal Service Operation" variabilityPoint="//
@assetManifest/@solution/@artifact.0/@artifact.14/@variabilityPoint.5"/>
        <variabilityPointBinding bindingRule="Import Binding" variabilityPoint="//
@assetManifest/@solution/@artifact.0/@artifact.14/@variabilityPoint.6"/>
     </activity>
     ...
   </artifactActivity>

...
  </usage>
  <relatedAsset name="BillASEAsset" relationshipType="previousversion"
assetId="{408720AA-AF0C-1B48-BC7E-9EFE456D01F6}"
   assetVersion="2.0"/>
 </assetManifest>
</com.ibm.ram.rich.ui.extension.core.wsmodel:AssetFileObject>
```

*FIG. 5B*

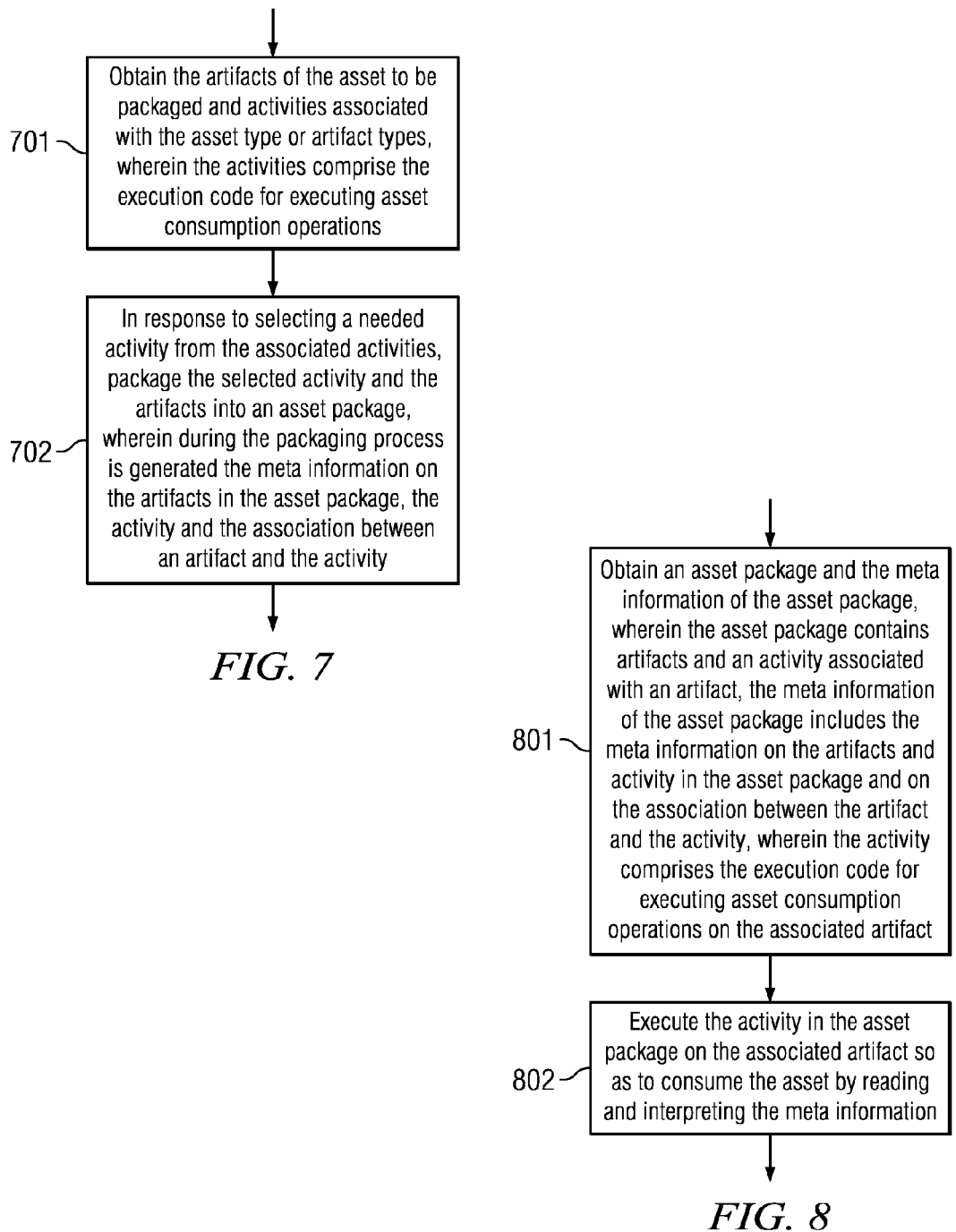

SOFTWARE ASSET PACKAGING AND CONSUMPTION

BACKGROUND

1. Field

The present invention relates to the technical field of reusable assets, and particularly to an asset packaging and consumption method and system.

2. Description of the Related Art

Consuming reusable assets can make an enterprise better able to respond to fast changing markets and business processes. From the business perspective, reusable assets enable fast assembly of business solutions, and shorten the time-to-market. From the IT perspective, reusable assets can automate and integrate business processes, significantly reduce the complexity of the development of large-scale projects, enable greater flexibility, and accelerate the delivery of solutions—thus delivering real value to the business.

The Reusable Asset Specification 2.2 promulgated by the Object Management Group (OMG) on Nov. 11, 2005 defines a standard way of packaging reusable software assets. The specification defines the structure, content and description of a reusable software asset, aiming to decrease attrition in reusing assets and enhance the reusability of assets through consistent and standard packaging.

At present, several tool vendors have implemented the currently released RAS XML schema in their tools.

For example, some common asset management products complying with RAS 2.2 consist of three major parts: an asset repository, web clients and rich clients (eclipse). They support asset search, packaging, consuming, and full life cycle management. To consume an asset means to download the asset, and get the artifacts. Although the guide as to how to use the artifacts may also be packaged into the asset, the user is still required to read the guide and manually perform the consuming steps.

The OSTNet's product AMS also complies with RAS 2.2. It consists of three major parts: AMS CodeCrawler, AMS FindIT, and AMS Registry. AMS CodeCrawler provides asset analysis functions, like finding dependency, duplicate code, etc. As to asset consumption, it also means only to obtain the asset.

BEA AquaLogic Enterprise Repository (Flush Line) complies with RAS 2.2. It includes a repository, and provides categories of assets. As for asset packaging, this is done manually; and as for asset consumption, there is no further support other than downloading an asset from the repository.

LogicLibrary's RAS supported product is Logicdex. To consume an asset in this tool also means to download the asset.

In current reusable asset solutions as described above, there is no association between asset packaging and asset consumption. That is, during packaging, only a set of artifact files and manifest file are packaged into the asset package, without the consumption operational steps of the asset and the contexts and variable parameters thereof also being packaged into the asset package, and as such, during consuming the asset, after simple downloading and copying, complex manual customization is needed, and automation of consumption operations cannot be achieved. Although it is possible to package a document for guiding the user's consumption operations into the asset package, the user is still required to read the document during consuming the asset and manually perform various consumption operational steps. In fact, a same reusable asset usually cannot completely apply to different contexts (clients, countries, business fields, etc). And today's software solutions are usually one-off. Even a so-called "standard" software solution typically comes from the instance of an actual development project, with no one defining how the software solution can vary according to different contexts. Therefore, in most cases, after the user obtains the asset, complex modifications need to be made manually during the assembling process. And for some asset types, the user needs to perform repetitive steps to generate further solutions. Such a manual method is not only inefficient, but also error prone, thus decreasing the potential benefits of reusable asset-based development.

Further, although it can be contemplated to package the execution code of consumption operations into the asset, so that during consumption the asset can be consumed automatically by executing the code, this requires the asset packager to write the execution code of consumption operations for each asset packaging, not only bringing about heavy development workload, but also lowering the asset reusability.

SUMMARY

In order to solve the above mentioned and other problems in the prior art, a solution in accordance with embodiments of the present invention is proposed.

In one aspect of the present invention, there is provided an asset packaging system, comprising: an obtaining module for obtaining artifacts of the asset to be packaged, and activities associated with the asset type or artifact types, wherein the activities comprise the execution code for executing asset consumption operations; and a packaging engine for, in response to selecting an activity from the associated activities, packaging the selected activity and the artifacts into an asset package, wherein the packaging engine generates and stores during the packaging process the meta information on the artifacts and the activity in the asset package, and the association between an artifact and the activity.

In another aspect of the present invention, there is provided an asset consumption system, comprising: an obtaining module for obtaining an asset package and the meta information of the asset package, wherein the asset package contains artifacts and an activity associated with an artifact, the meta information of the asset package includes the meta information on the artifacts and activity in the asset package and on the association between the artifact and the activity, wherein the activity comprises the execution code for executing asset consumption operations on the associated artifact; a consumption engine for executing the activity in the asset package on the associated artifact in the asset package to consume the asset through reading and interpreting the meta information.

In yet another aspect of the present invention, there is provided an asset packaging method, comprising: obtaining artifacts of the asset to be packaged, and activities associated with the asset type or artifact types, wherein the activities comprise the execution code for executing asset consumption operations; and in response to selecting an activity from the associated activities, packaging the selected activity and the artifacts into an asset package, wherein during the packaging process is generated and stored the meta information on the artifacts and the activity in the asset package, and the association between an artifact and the activity.

In still another aspect of the present invention, there is provided an asset consumption method, comprising: obtaining an asset package and the meta information of the asset package, wherein the asset package contains artifacts and an activity associated with an artifact, the meta information of the asset package includes the meta information on the artifacts and activity in the asset package and on the association between the artifact and the activity, wherein the activity comprises the execution code for executing asset consumption operations on the associated artifact; executing the activity in the asset package on the associated artifact in the asset package to consume the asset through reading and interpreting the meta information.

BRIEF DESCRIPTION OF THE SEVERAL VIEWS OF THE DRAWINGS

The inventive features believed to be characteristic of the present invention are set forth in the appended claims, however, the invention itself, and the preferred use mode, objects, features and advantages thereof can be better understood by reference to the detailed description of the illustrative embodiments when read in conjunction with the drawings, in which:

FIG. 4 illustrates an example of a configuration file in XML format generated in accordance with an embodiment of the invention;

FIG. 5 illustrates an example of a manifest file generated in accordance with an embodiment of the invention;

FIG. 7 illustrates an asset packaging method in accordance with an embodiment of the invention; and FIG. 8 illustrates an asset consumption method in accordance with an embodiment of the invention.

DETAILED DESCRIPTION

Figure 1:
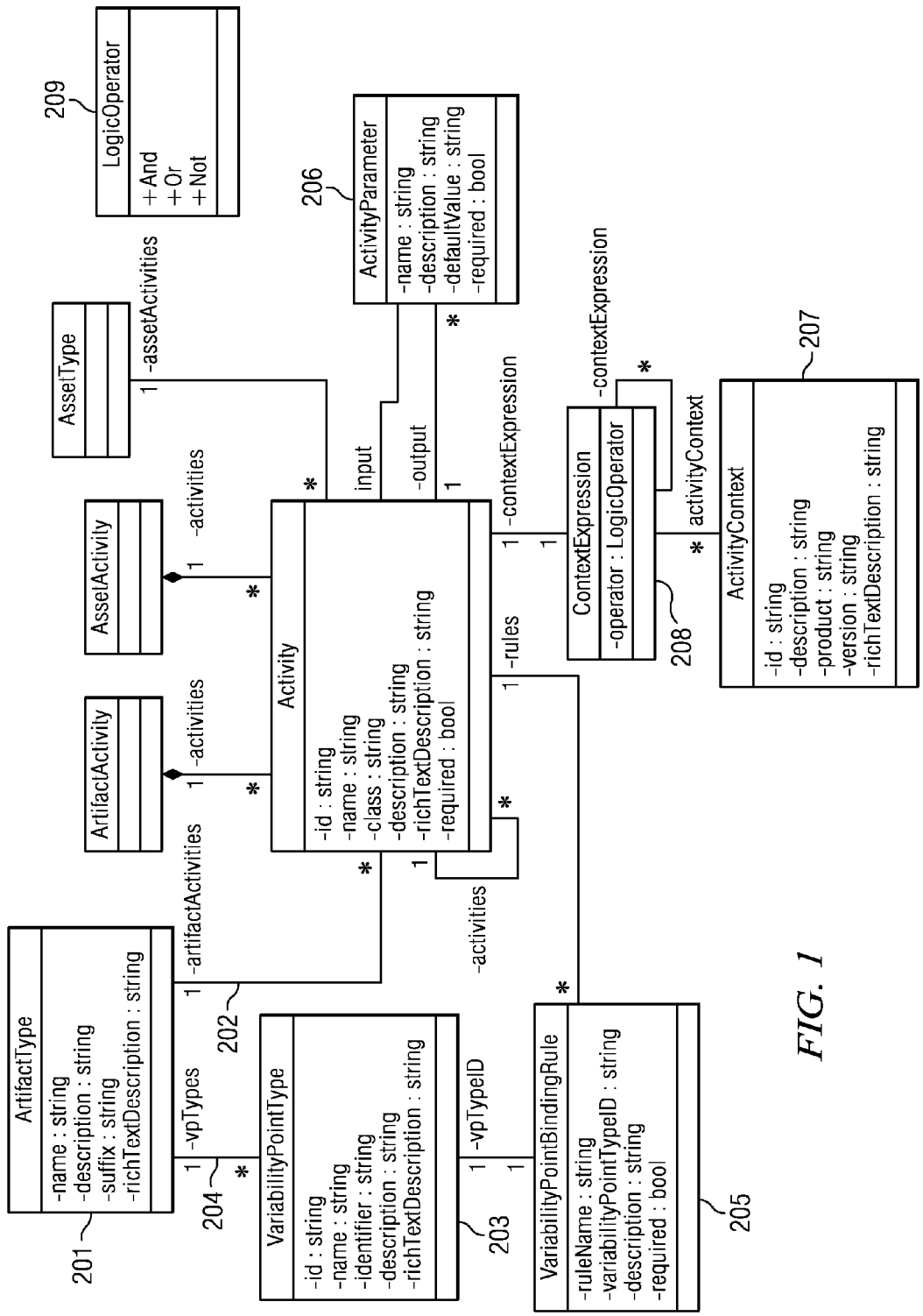
FIG. 1 illustrates an extended RAS model in accordance with an embodiment of the invention.

The meanings of several terms used in the application are as follows:

Software asset: asset for short, usually refers to any usable software resources, such as source code, WSDL code, solutions, applications, etc; more specifically, refers to a collection of artifacts providing a solution to a problem in a given context;

Artifact: refers to a software working product that can be created, stored and manipulated by an asset producer/consumer or a tool. An artifact can be an actual file in an asset package, or represent a logical entity including at least one sub-artifact as an actual file. An artifact can be a requirement document, model, source code file, deployment descriptor, test case, or script, etc.

Artifact type: classification of artifacts. For example, artifacts representing actual files can be classified according to the file types (binary, pure textual, etc.). Artifacts can be classified in different granularities according to different criteria. For example, WSDL files can be classified as an artifact type.

Activity: refers to the operations performed in applying an asset by the consumer or tool processing the asset. In embodiments of the present invention, an activity comprises the execution code for performing asset consumption operations and related attribute definitions that can be packaged into an asset package.

Variability point: a variability point may have a value provided or customized by the asset consumer in an asset. In embodiments of the present invention, a variability point is an instance of a variability point type, and may comprise an identifier code and attributes defined by the variability point type. The identifier code is used for identifying all the variability point values in an associated artifact, from which the asset consumer can select a variability point value as the value taken by this variability point. A variability point will be created when a variability point binding rule of an activity is defined. In embodiments of the present invention, a variability point is also referred to as a variability point instance.

Variability point type: a number of variability point instances having some identical characteristics belong to a same variability point type. In embodiments of the present invention, a variability point type comprises the identifier code for identifying all variability point values in an asset or artifact and relevant attribute definitions.

Variability point value: refers to a value that a variability point instance can take in asset consumption. A variability point value is identified in an artifact by the identifier code of a variability point instance and assigned to the variability point instance.

Context: refers to the execution environment in asset consumption. There can be many contexts defined in a manifest file. An artifact can declare its relevance to more than one context.

Asset package: a collection of artifact files plus a manifest file.

Manifest file: a file of meta information describing an asset. It can be an XML file verifiable against one of known RAS XML schemas.

The inventors of the present invention recognizes that for a given type of assets or artifacts, there usually are some common consumption activities, such as creating a mediation model from a web service interface, exposing a database service, etc., and there are also some common variability point types, the variability point instances of which can be located. In the current RAS specification, however, consumption activities and variability point instances are not associated with asset or artifact types, but for individual assets. To this end, embodiments of the present invention extend the current RAS specification, thus providing support for activities and variability point instances associated with asset types or artifact types. Developers can develop generic consumption activities and variability point types for different asset types or artifact types, and store them in a repository. When an asset packager packages an asset, he can select an activity needed from the activities associated with the type of the asset, and package the activity, a variability point instance bound with the activity, and the context constraints, together with the artifacts into the asset package, and store the asset package in a repository. During consumption, the asset consumer can obtain the asset package, verify the context, and execute the activity packaged in the asset, while specifying variability point values for the bound variability instance, thus obtaining all the consumption results for creating his own solution.

Embodiments of the present invention are based on an extension to the core RAS model in the RAS 2.2 specification. The core RAS model defines asset, profile, artifact, activity, context and other classes and relations between them. For a detailed description of the RAS 2.2 Specification and its core RAS model, refer to a formal document on the OMG website dated May 11, 2002.

FIG. 1 illustrates a RAS model extended in accordance with an embodiment of the present invention. As show, extensions to the RAS 2.2 Specification by an embodiment the present invention include:

(a) extending the ArtifactType class 201 by adding attributes such as name, suffix and description, wherein the attribute suffix is used for identifying the type of an artifact coming from a file resource;

(b) modifying the association between the Artifact class and the Activity class into the association 202 between the ArtifactType class and the Activity class;

(c) adding a VariabilityPointType class 203 to describe the type of variability point instances. This class include attributes such as id, name, identifier, description, richText-Description, wherein the identifier is the name of the identifier class of this variability point type, the identifier class being for implementing finding all the values of the variability point instance belonging to this variability point type from an associated artifact or asset;

(d) adding an association 204 between the ArtifactType class and the VariabilityPointType class;

(e) modifying the binding between the Activity class and the VariabilityPoint class into the binding between the Activity class and the VariabilityPointType class, which is realized by a newly-added VariabilityPointBindingRule class 205, which class includes attributes such as ruleName, variabilityPointTypeID, description, required (whether it is mandatory), etc.;

(f) adding an ActivityParameter class 206 to describe the parameters of an activity. This ActivityParameter class includes attributes such as name, description, defaultValue, required, etc.;

(g) adding an ActivityContext class 207 to describe the context of an activity. This ActivityContext class includes attributes such as id, description, product, version, rechText-Description, etc.; and (h) adding a relation between the Activity class and the ActivityContext class, which is realized by a newly-added ContextExpression class 208, which ContextExpression class has an operator attribute, the type of which operator attribute is a newly-added enumerator class LogicOperator 209, which enumerator class has the following fixed instances: AND, OR, NOT. Through the ActivityContext, ContextExpression and LogicOperator classes, complex context constraints of activities can be realized.

Of course, the extensions to the RAS 2.2 specification as described above are only illustration, instead of limitation to the present invention. Some embodiments of the present invention may not include one or more of the above extensions, for example, not including the above extensions (c)-(h), or not including the above extensions (f)-(h), or not including the above extensions (g)-(h); or may include more, less or different classes and attributes. For example, some embodiments of the present invention may further include an association between the Activity class and the AssetType class, and an association between the VariabilityPointType class and the AssetType class (not shown in the figure), etc. In addition, although some embodiments of the present invention are implemented based on an extended RAS specification, other embodiments of the present invention can also be implemented based on other existing or future standard or proprietary asset management specifications.

Figure 2:
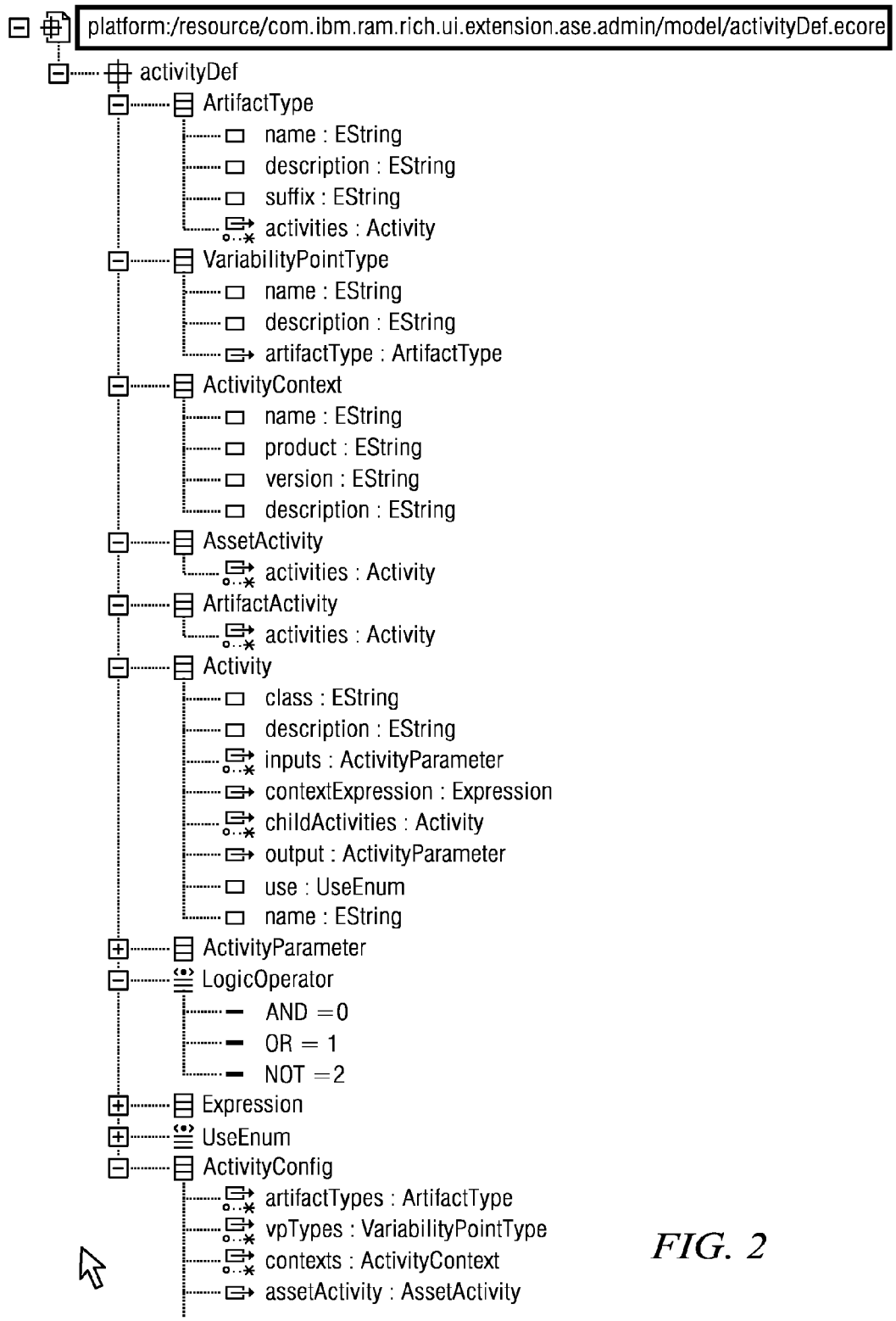
FIG. 2 illustrates an exemplary representation of a RAS XML schema complying with the extended RAS model.

FIG. 2 illustrates an exemplary representation of a RAS XML schema complying with this extended RAS model. This RAS XML schema defines classes such as ArtifactType, VariabilityPointType, ActivityContext, AssetActivity, ArtifactActivity, Activity, ActivityParameter, LogicalOperator and relations there among. The activity library developing system in accordance with an embodiment of the present invention as described below can operate according to the RAS XML schema to generate an activity library containing activities, variability point types, contexts, parameters, and the bindings between the activities and variability point instances, contexts, and parameters complying with the extended RAS model. The asset packaging system in accordance with an embodiment of the present invention can operate according to a similar RAS XML schema to generate an asset package complying with the extended RAS model.

Figure 3:
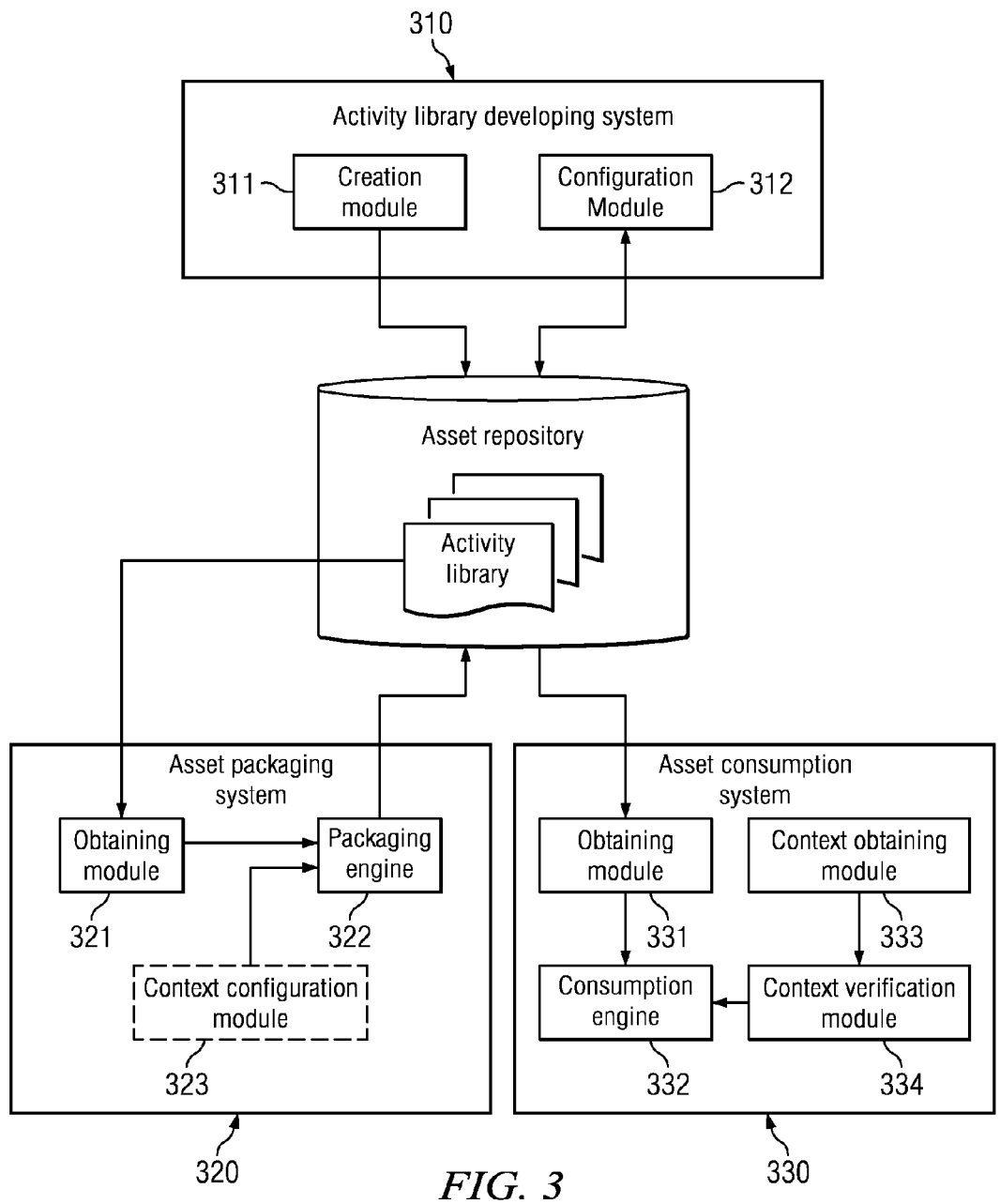
FIG. 3 illustrates the system architecture in accordance with an embodiment of the invention.

FIG. 3 illustrates the system architecture in accordance with an embodiment of the present invention. As shown, the system in accordance with an embodiment of the present invention comprises three parts: an activity library developing system 310, an asset packaging system 320 and an asset consumption system 330. The activity library developing system is used for developing activities and variability point types for specific asset types or artifact types, and storing the activities, variability point types and their meta information in an activity library for use by the asset packaging system 320; the asset packing system 320 is used for packing activities selected from the activity library and artifacts into assets; and the asset consumption system 330 is used for consuming the packaged asset. The three parts of the system in accordance with an embodiment of the invention will be described below.

As shown, in accordance with an embodiment of the present invention, there is provided an activity library developing system 310, comprising a creation module 311 and a configuration module 312.

The creation module 311 is used for creating activities that can be packaged into asset packages by the asset packaging system 320, and variability point types to which the variability point instances that can be packaged into asset packages by the asset packaging system 320 belong. In an embodiment of the present invention, an activity comprises the execution code for performing asset consumption operations and relevant attribute definitions, and a variability point type comprises the identifier code for identifying variability point locations in an asset or artifact, and relevant attribute definitions. Herein, the execution code and identifier code may be code that can be executed directly by a machine or executed by a machine after processing such as interpretation or compilation, including source code, intermediate code (e.g., Java byte code) or machine code, written in any language.

An activity library developer can create an activity by setting the attributes of the activity and developing the executing code of the activity in a corresponding user interface of the creation module 311. The attributes of the activity can be specified by the extended RAS model in accordance with an embodiment of the present invention as described above and shown in FIG. 1. For example, the activity library developer can input the name of the activity to be created, the type of the activity (i.e., the activity associated with an artifact type, or with an asset type), the name of the package in which the implementation class of the activity resides, and the name of the implementation class, etc., based on which the creation module 311, in accordance with an embodiment of the present invention, will create an activity with the corresponding attributes. The execution code of an activity is usually implemented by the implementation class of the activity, and can be written in another user interface by the activity library developer. The activity library developer can develop the execution code of an activity by using any appropriate method known in the art and according to the operational logic of the activity. Different asset or artifact types may have different applicable activities. Therefore, different activities and their execution code can be created for different asset or artifact types. For example, an artifact of the type of a WSDL file usually involves generating a web service client during the consumption. Therefore, an activity for generating a web service client can be created for the artifact type of a WSDL file, and the execution code of the activity will execute the following operations: obtaining a WSDL file, checking the passed parameters, such as GMS or HTTP binding, determining what environment the context is in, and if it is determined to be in the WPS SCA environment, generating a SCA model object, and at the same time setting the attributes of the model object according to the parameters, and finally generating and outputting a web service client; if it is determined to be in another environment, performing other relevant operations, etc.

An exemplary structure of the source code of the implementation class of an activity is shown as follows:

```
1.   public class CreateMediationFlowFromWSDL implements ITask {
2.   public IStatus execute(IProgressMonitor arg( ), Activity arg1)
3.   throw Exception{
4.      //TODO Auto-generated method stud
5.      return null;
6.   }
7.   ...
8.   public IStatus setup(IProgressMonitor arg( )){
9.      //TODO Auto-generated method stub
10.     return null;
``` wherein, the method "execute" is used for implementing the execution logic of the activity, and the user can insert corresponding execution code in the method body according to the specific operations of the activity during the consumption; the method "setup" is used for performing preparations for the execution of the activity, such as checking whether the context of the asset consumption is suitable for execution of the activity, etc., and the user can insert corresponding execution code in the method body according to the preparations needed for the execution of the activity.

The activity library developer can create a variability point type by setting the attributes of the variability point type in a corresponding user interface of the creation module 311 and developing the identifier code associated with the variability point type. The attributes of the variability point type may be those specified by the extended RAS model in accordance with an embodiment of the present invention as described above and illustrated in FIG. 1. For example, the activity library developer can input the name of the variability point type to be created, the unique ID of the variability point type, the name of the package in which the identifier class of the variability point type resides in, and the name of the identifier class, etc., and the creation module 311 in accordance with an embodiment of the present invention will create the variability point type having the corresponding attributes according to the input of the activity library developer in the user interface. The identifier code associated with the variability point type is usually implemented by an identifier class associated with the variability point type, and can be written by the activity library developer in another user interface. The identifier code associated with an variability point type is used for identifying all the variability point values of a variability point instance belonging to the variability point type in an asset or artifact, and can be developed by the activity library developer using any appropriate method known in the art according to the locations of the variability point values in the asset or artifact and the identifying method. Different asset or artifact types may have different applicable variability point types. Therefore, different variability point types can be developed for different asset or artifact types. Of course, a same variability point type can also be developed for a plurality of asset or artifact types. For example, assuming a variability point type developed for WSDL files is operational, an asset contains an artifact of the type of a WSDL file, and a variability point instance belonging to this variability point type has been created for this artifact of a WSDL file. If this artifact contains a plurality of operations, then each of the operations is a variability point value of the variability point instance, and the identifier code of the variability point instance (i.e., the identifier code associated with the variability point type) will find all the operations in the WSDL file, that is, all the variability point values.

An exemplary structure of the implementation code of the identifier class associated with a variability point type is shown as follows:

```
1.   public class WSDL PortType Identifier implements VPIdentifier {
2.   public List getVariants(IFile file) {
3.      //TODO Auto-generated method stub
4.   return null;
5.   }
6.   public List getFilteredVariants (IFile arg( ), String arg1, String
        arg2){
7.      //TODO Auto-generated method stub
8.   return null;
9.   }
10.  ...
11.  }
``` wherein, the method "getVariants" is used for obtaining all the variability point values of a variability point instance belonging to the variability point type from an asset or artifact, and the user can insert corresponding execution code in the method body according to the specific operational logic that can identify all the values of the variability point instance in an artifact or asset; the method "getFilteredVariants" is used for obtaining all the filtered variability point values of a variability point instance belonging to the variability point type, and the user can insert corresponding execution code in the method body according to the specific operational logic that can identify all the variability point values of the variability point instances in an artifact or asset and perform the required filtering.

In accordance with an embodiment of the invention, the creation module 311 is further used for setting the parameters of an activity. The set parameters correspond to the parameters of the corresponding method or function in the execution code of the activity. Thus, when the asset consumption system 310 in accordance with an embodiment of the invention consumes the asset and executes the activity in the asset package, the values of the set parameters can be provided or specified by the user, or obtained automatically from the context of the asset consumption, and provided to the corresponding method or function in the execution code of the activity. In this way, the activity can perform different operations according to different parameter values provided by the user or different consumption contexts, thus enhancing the generality of the activity and the reusability of the asset.

In accordance with an embodiment of the invention, the creation module 311 is further used for setting a variability point binding rule of an activity, which variability point binding rule binds a variability point instance to the activity, and corresponds to a certain point (e.g., a input parameter) in the execution process of the execution code of the activity. That is, the point in the execution process of the execution code of the activity needs a value provided from outside, and the value can be provided by a variability point value of the variability point instance. For example, for the above described exemplary asset containing an artifact of the type of a WSDL file, assume the activity created for the artifact type of a WSDL file will generate an interface transformation between two WSDL files. Generating an interface transformation needs two parameters: inputOperation and outputOperation. As such, two variability point binding rules can be created which correspond to the two parameters and have names inputOperation and outputOperation, respectively, and these two binding rules both bind to variability point instances belonging to the variability point type operation. In this way, when consuming the asset, by executing the activity and thus executing the identifier code of the bound variability point instances, all the operations in the WSDL file can be found, from which the user can select two specific operations, as the values of the two parameters inputOperation and outputOperation of the activity.

The activity library developer can set parameters for an activity and their attributes in, and set a variability point binding rule for an activity and its attributes in, corresponding user interfaces of the creation module 311. The binding rule will bind a variability point instance belonging to a developed variability point types to the activity, and the variability point instance may be generated after setting the binding rule and specifying the variability point type. The attributes of parameters and the attributes of binding rules may be those specified by the extended RAS model in accordance with an embodiment of the present invention as described above and shown in FIG. 1. For example, the activity library developer can add one or more parameters for an activity in the user interface, and set attributes, such as the name, type (input parameter or output parameter), short description, default value, required, etc., of the parameter. In addition, the activity library developer can add one or more variability point binding rules in the user interface, and set attributes, such as the name, variability point type ID, required, etc., of the binding rules, wherein the value of the attribute variability point type ID can be selected from the IDs of the variability point types that have been created.

The creation module 311 can store the created activity, variability point type, activity parameters, variability point binding rules and the associations therebetween in an activity library or other locations.

Returning to FIG. 3, the configuration module 312 is used for configuring the associations between activities and variability point types, and asset types or artifact types. The activity library developer can associate the created activities and variability point types stored in the activity library or another location with artifact types or asset types. A plurality of activities or a plurality of variability point types can be associated with a same artifact type or asset type. And a same activity or a same variability point type can be associated with a plurality of artifact types or asset types. Only by way of example, such associations can be stored in a configuration file, e.g., in XML format.

In accordance with an embodiment of the invention, the configuration module 312 is further used for setting the context of the execution of an activity. The context may include, for example, the hardware platform, OS platform, other related system software and application software, other assets, etc. A complex context can be set by using a context expression containing a plurality of contexts connected by logical operators such as AND, OR, NOT and parentheses. The set context may, for example, comply with the extended RAS model in accordance with an embodiment of the present invention as described above and shown in FIG. 1. For example, the context expression set for an activity may be (OS WindowsXP) AND (RSA 6.1 OR WID 6.1), denoting that the activity can only be extended in an environment of the WindowsXP operating system with RSA 6.1 or WID 6.1 installed. In accordance with other embodiments of the present invention, the context of the execution of an activity can also be set by the creation module 311.

For example, the activity library developer can select an artifact type from the list of system-supported artifact types (which may be identified by the suffixes of artifact files) shown in a corresponding user interface of the configuration module 312 in accordance with an embodiment of the invention, and select an activity to be associated with the selected artifact type from the shown list of created activities, and the system will automatically select the variability point instances bound with the activity. In addition, the activity library developer can create and edit the context expression for the selected activity in a corresponding user interface in accordance with an embodiment of the present invention.

The configuration file generated from the above described configuration process by the configuration module 312 reflects the meta information such as the associations between an asset type or artifact type, and an activity and variability point type, the parameters and variability point binding rules of the activity, the context of the activity, etc. The configuration module 312 may store the configuration file in an activity library, retrieve from the activity library the stored configuration file and related activity and variability point type, and after updating the activity and variability point instances and their associations with the asset type or artifact type, update the configuration file correspondingly. That is, the configuration module 312 can maintain the activity library through the configuration file, such as looking-up, adding, deleting, modifying activities and variability point types contained in the activity library and their associations with asset types or artifact types. The configuration file can also be accessed, used and updated by the asset packaging system 320 in accordance with an embodiment of the present invention.

FIG. 4 illustrates an exemplary configuration file in XML format generated in accordance with an embodiment of the present invention. As shown, the configuration file defines an artifact type through an "artifactType" element with the ID of "1", defines two activities through the sub-elements "activity" with the IDs of "0001" and "0002" respectively of the sub-element "activities" of the "artifactType" element, and defines the associations between the two activities and the artifact type; defines another artifact type through another "artifactType" element with the ID of "2"; defines a variability point type through a "variabilityPointType" element with the ID of "001", and defines the association between the variability point type and the artifact type with the ID of "1" through the attribute "artifactType='1'" of the "variabilityPointType" element; defines three activity contexts through three "activityContext" elements with the ID of "01", "02", and "03" respectively; then defines in a "assetActivities" element that the activity with the ID of "0001" belongs to activities of the asset type, and further defines the parameters and context of the activity, wherein the context is defined as a combination of the above activity contexts through logical operators; and defines in an "artifactActivities" element that the activity with the ID of "0002" is an activity associated with an artifact type, and further defines the parameters and context of the activity, wherein the context is also defined as a combination of the above activity contexts through logical operators.

In accordance with some embodiment of the present invention, the functions of the configuration model 312 can also be performed by the creation module 311, in which case a separate configuration model 312 is no longer needed. In such embodiments, a created activity or variability point type can be associated with the corresponding artifact type or asset type while the activity or variability type is created.

The activity library can either reside within the asset repository for storing artifacts and assets as shown in the figure, or reside in any other location outside the asset repository and accessible to the asset packaging system 320.

While the activity library developing system 310 in accordance with an embodiment of the present invention has been described above, it should be pointed out that the above description is only an exemplary illustration of an embodiment of the present invention, rather than limitation to the present invention. For example, in some embodiments of the present invention, the activity library developing system 310 or part of its functions may also be implemented by the asset packaging system 320 in accordance with an embodiment of the present invention. For example, the creation 311 and the configuration module 312 can be included in the asset packaging system 320, thus the asset packaging system 320, after creating the required activity and variability point type and performing appropriate configurations, can package the activity and possibly variability point instances together with artifacts into an asset package, without needing a dedicated activity library developing system 310.

As shown in FIG. 3, in another aspect of the present invention, there is further provided an asset packaging system 310, comprising: an obtaining module 321, and a packaging engine 322.

The obtaining module 321 can be used for obtaining artifacts and activities associated with artifact types or asset types, and for obtaining variability point instances bound to activities and associated with artifact types or asset types. The obtaining module 321 can obtain artifacts from an asset repository or any other locations, and can obtain activities and variability point instances bound to activities and associated with asset types or artifact types from an activity library or any other locations. Particularly, this can realized by first obtaining from an activity library a configuration file reflecting the associations between an asset type or an artifact type and activities and variability point types, as well as the bindings between activities and variability point instances, and finding the activities associated with the corresponding artifact type and the variability points bound with the activities.

The packaging engine 322 is used for creating an asset, and in response to user selected artifacts and selected activities associated with the asset type or artifact types, packaging the asset, artifacts and selected activities associated with the asset type or artifact types into an asset package. Particularly, the packaging engine 322 can create an asset according to asset attributes input in a corresponding user interface by the user, and obtain artifacts to be included in the asset from the obtaining module 321 according to the user's selection, and display in the user interface all the activities associated with the type of asset and the types of the artifacts selected by the user in order for the user to select therefrom the activities to be packaged into the asset package, and then package the asset, artifacts and activities into an asset package. When the activities selected by the user have variability point bindings, the packaging engine 322 is further used for packaging the variability point instances bound with the activities into the asset package as well. During the packaging process, the packaging engine 322 will generate the meta information on the selected artifacts, activities and possibly variability point instances according to the user's inputs and selection and the attributes of the artifacts, activities and possibly variability point instances, and store the meta information in, for example, the manifest file to be packaged into the asset package. The meta information can include, for example, the information on the attributes of the selected artifacts, the attributes of the activities and variability point instances and their associations with the artifacts. In other words, the asset packager can define the consumption steps of an asset, including the dependency and execution order between the activities of asset consumption etc., according to existing artifacts, activities, variability point instances and other related information, as well as the reuse requirements of the asset. The information on these consumption steps and the attributes and associations of the artifacts, activities, variability point instances constitutes the meta information of the asset, which will become part of the manifest file when releasing the asset.

In accordance with an embodiment of the present invention, if an activity and a variability point instance are associated with an asset type, the activity and the variability point instance will be considered as associated with each artifact contained in an asset of the asset type, and during packaging, the meta information on the associations between the activity and variability point instance and each of the artifacts in the asset will be generated.

In accordance with an embodiment of the present invention, in response to determining that an activity needing to be packaged has a variability point binding, the packaging engine 322 first determines whether the artifact type associated with the variability point type to which the variability point instance belongs is consistent with the artifact type currently associated with the activity, and only when the determination is positive, packages the activity and the variability point instance into the asset package, and when the determination is negative, does not package the activity and the variability point instance into the asset package. This provides a validation mechanism in order that correct artifacts, activities and variability point instances be packaged into an asset package.

In some other embodiments of the present invention, when a user-selected activity needing to be packaged has a variability point binding, the packaging engine 322 does not package the variability point instance directly into the asset package, but first applies the variability point instance to the artifact associated with the activity, that is, executing the identifier code of the variability point instance on the artifact, thus generating all the variability point values of the variability point instance in the artifact, and then packages the variability point values into the asset package.

In accordance with an embodiment of the present invention, if the activity needing to be packaged has parameters, the packaging engine 322 is further used for generating the meta information on the parameters and their associations with the activity, and storing the meta information in, for example, the manifest file to be packaged into the asset package. In accordance with a further embodiment of the present invention, the packaging engine 322, before generating the meta information on the parameters and their association with the activity, may allow the user to further limit the parameters of the activity as set in the activity library developing system 310, such as, limiting the scope of values of the parameters to adapt to the present asset.

In accordance with an embodiment of the present invention, the asset packaging system 320 further comprises an optional context setting module 323 for setting the context for the selected activity. That is, the context setting module 323 can be used for further limiting by the user the context of the activity as set in the activity library developing system 310 to adapt to the present asset, and the packaging engine 322 may further store the meta information of the further limited context of the activity in, for example, the manifest file to be packaged into the asset package.

In accordance with an embodiment of the present invention, the packaging engine 322 may further be used for ranking a plurality of activities when packaging the plurality of activities into the asset package, so as to forming a certain activity flow. The packaging engine 322 may further be used for setting the input and output relationships among the activities, that is, setting the output parameter of one activity as the input parameter of another activity.

The packaging process performed by the packaging engine 322 involves generating a manifest file containing the meta information on the artifacts, activities, variability point instances or variability point values, parameters, contexts, etc. in the asset, and relations thereamong according to a RAS XML schema representing the above described extended RAS model, and packaging the artifacts in the asset and the manifest file into an archive file. Of course, the manifest file or the meta information can also be stored in any other locations accessible to the asset consumption system 330, such as a server in a network. How to generate the RAS XML schema from the extended RAS model is obvious to those skilled in the art.

FIG. 5 illustrates an exemplary manifest file generated by the packing engine in accordance with an embodiment of the present invention. As shown, in the manifest file, the first element defines the root of the asset and the location and version of the RAS XML schema file for verifying the manifest file. The <assetManifest> element defines the attributes, such as the name and ID, of the manifest file. In the <solution> section are defined the artifacts and their associated variability point instances contained in the asset, wherein the <artifact> element defines an artifact and its name and type attributes, the <reference> element defines the location of the artifact in the asset package, the <variabilityPoint> element defines a variability point instance associated with the artifact and its attributes, the <description> element provides further description of the variability point instance, wherein the <variants> defines the variability point values from which the variability point instance can select a value, which variability point values was generated by executing the identifier of the variability point on the artifact. In the <usage> section are defined the activities associated with the artifacts and their variability point bindings, wherein in the <artifactActivity> element are included all the activities in the asset associated with artifacts, the <activity> element defines the attributes, such as the name, type, associated artifact, of the activity, the <variabilityPointBinding> element defines the variability point binding rule of the activity and its attributes, such as the name, bound variability point instance, etc. As known to those skilled in the art, the exemplary manifest file may further contain other meta information not shown on artifacts, activities, variability point instances, and parameters and contexts of activities, and associations and bindings thereamong, etc.

In accordance with an embodiment of the present invention, the asset packaging system 320 may further comprise an optional uploading module (not shown) for uploading the finished asset package into an asset repository for the consumption by an asset consumer. Of course, the asset package can also be stored in any other location accessible to an asset consumption system.

Returning to FIG. 3, in accordance with another embodiment of the present invention, there is further provided an asset consumption system 330, comprising: an obtaining module 331, and a consumption engine 332.

The obtaining module 331 is used for obtaining an asset package, for example, in response to a command from a user, obtaining an asset package generated by the asset packaging system 320 in accordance with an embodiment of the present invention from an asset repository or any other locations.

The consumption engine 332 is used for reading and interpreting the meta information of the asset package, and consuming the asset by automatically executing an activity in the asset package, thus generating a corresponding solution. The consumption engine 332 may, in response to an asset consumption command from the user, obtain an activity in the asset package associated with the asset type or an artifact type by interpreting the meta information of the asset package, such as the manifest file in the asset package, and automatically execute the activity.

In accordance with an embodiment of the present invention, when the activity in the asset package includes parameters, the consumption engine 332 is further used for obtaining the parameter values specified for the parameters of the activity during executing the activity, thus customizing the activity. That is, when the consumption engine 332 executes the activity and determines that the activity requires parameters, it will automatically display a user interface for specifying parameter values, and in response to the user specifying corresponding parameter values in the user interface, pass the parameter values to the execution code of the activity. In this way, the activity can perform different operations according to different parameter values specified by the user.

In accordance with an embodiment of the present invention, when the activity in the asset package contains a variability point binding, the consumption engine 332 is further used for receiving a variability point value specified for the variability point instance bound with the activity, as the value of the variability point instance, thus customizing the activity. That is, when executing the activity in the asset package, the identifier code of the variability point instance bound with the activity will also be executed so as to find a number of variability point values in the artifact of the asset, from which the user can select, thus customizing the activity. If the asset package already contains the variability point values generated during the packaging process, it is no longer needed to execute the identifier of the variability point instance, and the user can select directly from the variability point values.

In accordance with an embodiment of the present invention, the asset consumption system 330 further comprises the following optional modules: a context obtaining module 333, and a context verification module 334.

The context obtaining module 333 is used for obtaining the current context of asset consumption. The context obtaining module 333 can obtain the current context of asset consumption using any method know in the art, and the context may include, for example, the current hardware platform, OS platform, other related system software and application software, other assets, etc.

The context verification module 334 is used for verifying whether the current context matches with the context of the activity in the asset package. In particular, the context verification module 334 may read the context expression of the activity in the meta information of the asset package, and determine whether the current context satisfy the context expression. In response to the current context matching the context of the activity in the asset package, the consumption engine 332 may execute the activity; and in response to the current context not matching the context of the activity in the asset package, it may not execute the activity.

While above have been described an activity library developing system 310, an asset packaging system 320 and an asset consumption system 330 in accordance with an embodiment of the present invention, it should be pointed out that the above description and numerous details therein are only illustration, instead of limitation to the present invention. In other embodiments of the present invention, the systems may have more, less, or different components, and the connection, containment or other relationships among the components may be different from that described. For example, the activity library developing system 310 may also reside within the asset packaging system 320, etc. All these variations are within the spirit and scope of the present invention.

Below will be described an activity library developing method, an asset packaging method and an asset consuming method in accordance with an embodiment of the present invention corresponding to the above described activity library developing system 310, asset packaging system 320 and asset consuming system 330. For brevity, in the following description, some content redundant with the above description is omitted, and thus reference can be made to the above description for a more detailed understanding of the methods in accordance with an embodiment of the present invention.

Figure 6:
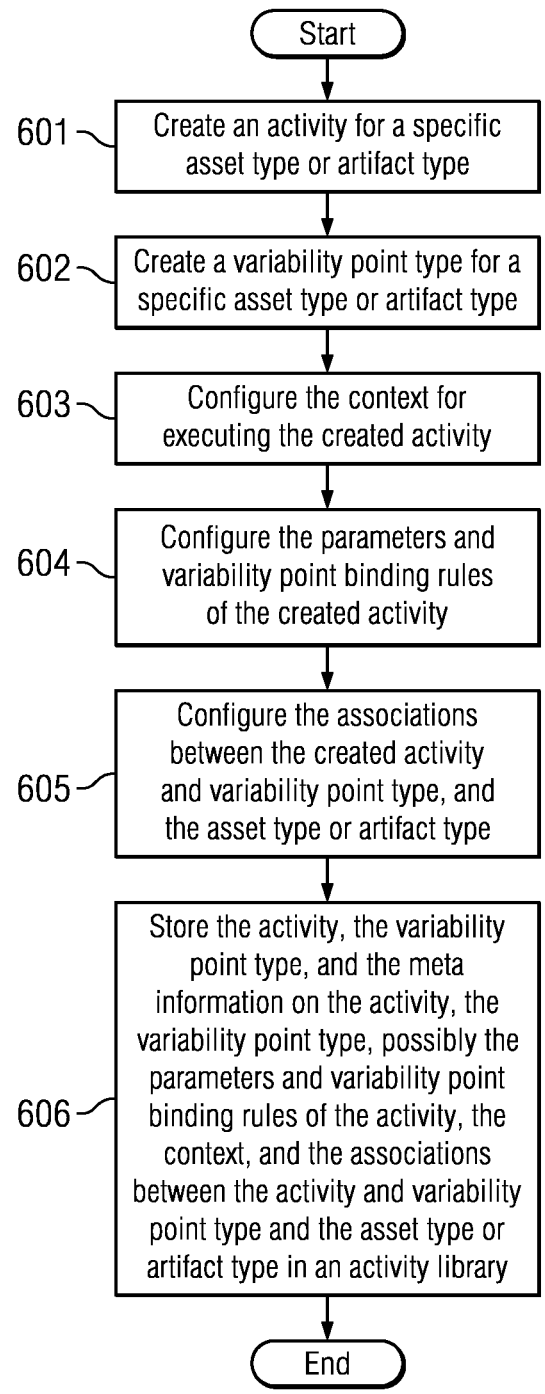
FIG. 6 illustrates a method for developing an activity library in accordance with an embodiment of the invention.

FIG. 6 illustrates an activity library developing method in accordance with an embodiment of the present invention. As illustrated, the method comprises the following steps:

In step 601, an activity for a specific asset type or artifact type is created.

In step 602, a variability point type for a specific asset type or artifact type is created.

In step 603, the context for executing the created activity is configured.

In an optional step 604, the parameters and variability point binding rules of the created activity are configured.

In step 605, the associations between the created activity and variability point type, and the asset type or artifact type are configured.

In step 606, the activity, the variability point type, and the meta information on the activity, the variability point type, possibly the parameters and variability point binding rules of the activity, the context, and the associations between the activity and variability point type and the asset type or artifact type are stored in an activity library.

FIG. 7 illustrates an asset packaging method in accordance with an embodiment of the present invention. As shown, the method comprises the following steps:

In step 701, the artifacts of the asset to be packaged and activities associated with the asset type or artifact types are obtained, wherein the activities contain the execution code for executing asset consumption operations.

In step 702, in response to selecting a needed activity from the associated activities, the selected activity and the artifacts are packages into an asset package, wherein during the packaging process the meta information on the artifacts in the asset package, the activity and the association between an artifact and the activity are generated.

In accordance with an embodiment of the present invention, the method further comprises: packaging a variability point instance bound with the selected activity and associated with the asset type or an artifact type into the asset package, wherein the variability point instance comprises the identifier code for identifying variability point values in an associated artifact; and wherein, during the packaging process is further generated and stored the meta information on the variability point instance and its binding with the activity. Alternatively, it is not the variability point instance itself bound with the activity that is packaged into the asset package, rather first the variability point instance is applied to the artifact associated with the activity, that is, the identifier code of the variability point instance is executed so as to generate all the variability point values in the artifact, and then these variability point values are packaged into the asset package, such as storing the variability point values into the manifest file.

In accordance with an embodiment of the invention, during the packaging process is further generated and stored the meta information on the parameters of the activity in the asset package.

In accordance with an embodiment of the invention, during the packaging process is further generated and stored the meta information on the context for executing the activity in the asset package.

In accordance with an embodiment of the invention, packaging the selected activity and artifacts into an asset package comprises packaging a plurality of activities into the asset package; and wherein, during the packaging process is further generated and stored the meta information on the execution order and input and output relationships among the plurality of activities.

FIG. 8 illustrates an asset consumption method in accordance with an embodiment of the present invention. As shown, the method comprises the following steps:

In step 801, an asset package and the meta information of the asset package are obtained, wherein the asset package contains artifacts and an activity associated with an artifact, the meta information of the asset package includes the meta information on the artifacts and activity in the asset package and an association between the artifact and the activity, wherein the activity comprises the execution code for executing asset consumption operations on the associated artifact.

In step 802, by reading and interpreting the meta information, the activity in the asset package is executed on the associated artifact so as to consume the asset.

In accordance with an embodiment of the present invention, the asset package further contains a variability point instance bound with the activity in the asset package and associated with an artifact, wherein the variability point comprises the identifier code for identifying variability point values in the associated artifact; the meta information of the asset package further include the meta information on the variability point instance and its binding with the activity; and the method further comprises obtaining the variability point values in the artifact through executing the identifier code of the bound variability point instance on the associated artifact during executing the activity in the asset package, and providing a selected variability point value to the activity so as to customize the activity. Of course, if the asset package already contains the variability point values generated during the packaging process, it is no longer necessary to execute the identifier code of the variability point instance, rather, a variability point value can be selected directly therefrom and provided to the activity as the value of the variability point instance, so as to customize the activity.

In accordance with an embodiment of the present invention, the meta information of the asset package further includes the meta information on the parameters of the activity in the asset package; and the method further comprises receiving values specified for the parameters of the activity in the assert package during executing the activity, so as to customize the activity.

In accordance with an embodiment of the present invention, the meta information of the asset package further includes the meta information on the context for executing the activity in the asset package, and the method further comprises obtaining the current context of asset consumption; determining whether the current context matches with the context of the activity in the asset package; in response to the determination being positive, executing the activity; and in response to the determination being negative, not executing the activity.

While above is described the methods in accordance with embodiments of the present invention, it should be pointed out that the above description is only an illustration, rather than limitation to the present invention. In other embodiment of the present invention, the methods can have more, less or different steps, and steps may have an order different from that described or may be executed in parallel.

Embodiments of the present invention realize one or more of the following and other advantages:

By packaging activities of asset consumption and variability point instances into the asset, the automatic execution and customization of asset consumption is realized, avoiding the low efficiency and possible errors of manual asset consumption;

By developing generic consumption activities and variability point types for asset types or artifact types, sharing of these consumption activities and variability point types is enabled. In this way, asset packagers need only to select, without needing any programming skills, thus greatly alleviating the workload of asset packagers, and reducing repetitive work in asset packaging.

By packaging generic consumption activities and variability point instances into an asset package, the reusability of the asset package is enhanced, and the scope of the reusability is extended;

By associating the developed generic consumption activities and variability point types with asset types or artifact types, a validation mechanism in asset packaging is provided, ensuring correct consumption activities and variability point instances are packaged into the asset package;

By defining the execution context for a consumption activity and packaging the context together with the consumption activity into an asset, context-aware asset consumption is realized, and a validation mechanism in asset consumption is provided, ensuring consuming the asset correctly.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods.

What is claimed is:

1. A computer system, including a non-transitory storage device and an enhanced implementation of a Reusable Asset Specification 2.2, for packaging an asset, comprising:
   an obtaining module for obtaining, from an asset repository, using an ArtifactType class of the enhanced implementation including attributes of name, suffix, and a description, wherein the suffix is used for identifying an artifact type of the artifacts coming from the asset repository, artifacts of the asset to be packaged into an asset package, and activities associated with an asset type of the asset or an artifact type of the artifacts, and wherein the activities comprise execution code for executing asset consumption operations and related attribute definitions to be packaged into the asset package;
   a packaging engine in response to (i) selecting an activity from the activities associated with the asset type or the artifact type using an association between the ArtifactType class and an Activity class of the enhanced implementation and (ii) specifying at least one variable point value for a variable point instance bound to a selected activity and associated with the asset type or the artifact type, wherein a VariabilityPointType class of the enhanced implementation describes a type of variability point instance, including attributes of an ID, a name, an identifier, a description, and a richTextdescription, and wherein the identifier is a name of an identifier class of a respective variability point type, for finding all values of a particular variability point instance belonging to a specific variability point type from an associated artifact or associated asset, and wherein a binding between the Activity class and the VariabilityPointType class, uses a VariabilityPointBindingRule class, of the enhanced implementation including attributes of a ruleName, a variabilityPointTypeID, and a description for packaging the selected activity and the artifacts into the asset package;
   wherein the packaging engine generates and stores in the non-transitory storage device the asset package, and wherein the asset package further comprises (i) meta information on the artifacts and the selected activity, including information on consumption operations and attributes and associations of the artifacts, activities, and variability point instances and (ii) an association between the asset type or the artifact type and the selected activity; and
   wherein the obtaining module and the packaging engine are components of the enhanced implementation of the Reusable Asset Specification 2.2, and wherein the activities in the asset package perform different operations in response to different values provided for parameters of a respective activity by a user or different consumption contexts, to increase a scope of reusability of the asset.

2. The computer system according to claim 1, wherein:
   the packaging engine further packages, into the asset package, the particular variability point instance bound with the selected activity and associated with the asset type or the artifact type, and wherein the variability point instance comprises an identifier code, when executed by the computer system, for identifying variability point values in an associated artifact of the artifacts and is created when a variability point binding rule of the associated artifact is defined; and wherein the packaging engine further generates and stores, in the asset package during the packaging, process meta information on the variability point instance and a respective binding with the selected activity, and wherein the enhanced implementation of the Reusable Asset Specification 2.2 further includes enhancements comprising:
   a modified association between an Artifact class and an Activity class to form an association between the ArtifactType class and the Activity class;
   an association between the ArtifactType class and the VariabilityPointType class;
   an addition of an ActivityParameter class describing parameters of a respective activity and including attributes of a name, a description, a defaultValue, and an indication of whether a parameter is required;

an addition of an ActivityContext class to describe a context of the respective activity and including attributes of an ID, a description, a product, a version, and a richTextdescription; and an addition of a relation between the Activity class and the ActivityContext class, using a ContextExpression class, including an operator attribute, as an enumerator class LogicOperator, having fixed instances including operators: AND, OR, NOT, and parenthesis.

3. The computer system according to claim 1, wherein:

the packaging engine further executes, for an artifact associated with the selected activity, an identifier code comprised in the particular variability point instance bound with the selected activity to generate at least one variability point value in the artifact, and packages the at least one variability point value into the asset package, and wherein the identifier code comprised in the variability point instance is used to identify variability point values in the associated artifact and is created when a variability point binding rule of the associated artifact is defined; and wherein, the packaging engine further generates and stores, in the asset package during a packaging process, meta information on the variability point instance and a respective binding with the selected activity.

4. The computer system according to claim 1, wherein:

the packaging engine further generates and stores, in the asset package during a packaging process, meta information on a context for executing the selected activity.

5. The computer system according to claim 1, further comprising:

a creation module for creating the activity and the specific variability point type for the asset type or the artifact type, for setting the parameters of the activity and for setting the variability point binding rule of the activity, which binds the particular variability point instance to the activity, and corresponds to a particular point in an execution process of the execution code of the activity, wherein a value can be provided by a variability point value of the particular variability point instance;

a configuration module for configuring a context for executing the activity created, and associations between the activity created and the specific variability point type, and the asset type or artifact type; and a storing module for storing in an activity library the activity created, the specific variability point type, and meta information describing the activity created, the context, and the associations between the activity created and the specific variability point type, and the asset type or artifact type.

6. A computer system including a storage memory device and an enhanced implementation of a Reusable Asset Specification 2.2, for consuming an asset, comprising:

an obtaining module for obtaining an asset package and meta information of the asset package, wherein the asset package uses an ArtifactType class of the enhanced implementation including attributes of name, suffix, and a description, and wherein the suffix is used for identifying an artifact type of the artifacts coming from an asset repository, and wherein the asset package contains artifacts and an activity associated with an artifact of the artifacts, the meta information of the asset package includes meta information on the artifacts and the activity in the asset package and an association between an associated artifact and the activity, and wherein the activity comprises execution code for executing asset consumption operations on the associated artifact and related attribute definitions packaged into the asset package; and a consumption engine for automatically executing the activity in the asset package on the associated artifact in the asset package to consume the asset through reading from the storage memory device and interpreting the meta information;

wherein a plurality of the activities associated with an asset type of the asset or an artifact type of the artifacts are packaged into the asset package using an association between the ArtifactType class and an Activity class of the enhanced implementation, and wherein the asset package defines consumption steps of the asset, including a dependency and execution order between the plurality of the activities packaged into the asset package, wherein:

the asset package further comprises a variability point instance bound with the activity in the plurality of the activities of the asset package and associated with an artifact, wherein a VariabilityPointType class of the enhanced implementation describes a type of variability point instance, including attributes of an ID, a name, an identifier, a description, and a richTextdescription, and wherein the identifier is a name of an identifier class of a respective variability point type, for finding all values of a particular variability point instance belonging to a specific variability point type from an associated artifact or associated asset and wherein a binding between the Activity class and the VariabilityPointType class, uses a VariabilityPointBindingRule class, of the enhanced implementation including attributes of a ruleName, a variabilityPointTypeID, and a description, and wherein the variability point instance comprises an identifier code, when executed by the computer system, for identifying variability point values in the associated artifact and is created when a variability point binding rule of the associated artifact is defined;

the meta information of the asset package further includes meta information on the variability point instance and a respective binding with the activity, including information on consumption operations and attributes and associations of the artifacts, activities, and variability point instances; and the consumption engine further obtains the variability point values in the associated artifact, through executing the identifier code of the variability point instance bound on the associated artifact, during executing the activity in the asset package, and provides a selected variability point value to the activity to customize the activity, wherein the activity of the asset package performs different operations in response to different values provided for parameters of the activity by a user or different consumption contexts, thus increasing a scope of reusability of the asset, and wherein the obtaining module and the consumption engine are components of the enhanced implementation of the Reusable Asset Specification 2.2.

7. A computer system including a storage memory device and an enhanced implementation of a Reusable Asset Specification 2.2, for consuming an asset, comprising:

an obtaining module for obtaining an asset package and meta information of the asset package, wherein the asset package uses an ArtifactType class of the enhanced implementation including attributes of name, suffix and a description, and wherein the suffix is used for identifying an artifact type of the artifacts coming from an asset repository, and contains artifacts and an activity associated with an artifact of the artifacts, the meta information of the asset package includes meta information on the artifacts and the activity in the asset package and an association between an associated artifact and the activity, and wherein the activity comprises execution code for executing asset consumption operations on the associated artifact and related attribute definitions packaged into the asset package; and a consumption engine for automatically executing the activity in the asset package on the associated artifact in the asset package to consume the asset through reading from the storage memory device and interpreting the meta information;

wherein a plurality of the activities associated with an asset type of the asset or an artifact type of the artifacts are packaged into the asset package using an association between the ArtifactType class and an Activity class of the enhanced implementation, and wherein the asset package defines consumption steps of the asset, including a dependency and execution order between the plurality of the activities packaged into the asset package, wherein:

the asset package further comprises variability point values of a variability point instance bound with the activity in the asset package and associated with the associated artifact, created when a variability point binding rule of the associated artifact is defined, wherein a VariabilityPointType class of the enhanced implementation describes a type of variability point instance, including attributes of an ID, a name, an identifier, a description, and a richTextdescription, and wherein the identifier is a name of an identifier class of a respective variability point type, for finding all values of a particular variability point instance belonging to a specific variability point type from an associated artifact or associated asset, and wherein a binding between the Activity class and the VariabilityPointType class, uses a VariabilityPointBindingRule class, of the enhanced implementation including attributes of a ruleName, a variabilityPointTypeID, and a description, and wherein the variability point values are located by applying on the associated artifact an identifier code of the variability point instance for identifying the variability point values in the associated artifact;

the meta information of the asset package further includes the meta information on the variability point instance and respective binding with the activity, including information on consumption operations and attributes and associations of the artifacts, activities, and variability point instances; and the consumption engine further provides a variability point value selected from the variability point values to the activity in the asset package to customize the activity during executing the activity, wherein the activity of the asset package performs different operations in response to different values provided for parameters of the activity by a user or different consumption contexts, thus increasing a scope of reusability of the asset, and wherein the obtaining module and the consumption engine are components of the enhanced implementation of the Reusable Asset Specification 2.2.

8. The computer system according to claim 6, wherein the meta information of the asset package further includes meta information on a context for executing the activity in the asset package, and the system further comprises:

a context obtaining module for obtaining a current context of the asset consumption;

a context determination module for determining whether the current context matches with the context of the activity in the asset package;

wherein the consumption engine further executes the activity in response to the determination being positive; and wherein the enhanced implementation of the Reusable Asset Specification 2.2 further includes enhancements comprising:

an addition of an ActivityParameter class describing parameters of an activity and including attributes of a name, a description, a defaultValue, and an indication of whether a parameter is required;

an addition of an ActivityContext class to describe a context of the activity and including attributes of an ID, a description, a product, a version, and a richTextdescription; and an addition of a relation between the Activity class and the ActivityContext class, using a ContextExpression class, including an operator attribute, as an enumerator class LogicOperator, having fixed instances including operators: AND, OR, NOT, and parenthesis.

9. A computer implemented method for packaging an asset in an enhanced implementation of a Reusable Asset Specification 2.2, comprising:

obtaining artifacts, from an asset repository using an ArtifactType class of the enhanced implementation including attributes of name, suffix and a description, wherein the suffix is used for identifying an artifact type of the artifacts coming from the asset repository, of an asset to be packaged into an asset package, and activities associated with an asset type of the asset or an artifact type of the artifacts, wherein the activities comprise execution code for executing asset consumption operations and related attribute definitions to be packaged into the asset package; and in response to (i) selecting an activity from the activities associated with the asset type or the artifact type using an association between the ArtifactType class and an Activity class of the enhanced implementation and (ii) specifying at least one variable point value for a variable point instance bound to a selected activity and associated with the asset type or the artifact type, wherein a VariabilityPointType class of the enhanced implementation describes a type of variability point instance, including attributes of an ID, a name, an identifier, a description, and a richTextdescription, and wherein the identifier is a name of an identifier class of a respective variability point type, for finding all values of a particular variability point instance belonging to a specific variability point type from an associated artifact or associated asset, and wherein a binding between the Activity class and the VariabilityPointType class, uses a VariabilityPointBindingRule class, of the enhanced implementation including attributes of a ruleName, a variabilityPointTypeID, and a description packaging the selected activity and the artifacts into the asset package;

wherein during a packaging process, meta information on the artifacts and the selected activity, including information on consumption operations and attributes and associations of the artifacts, activities, and variability point instances and an association between the asset type or the artifact type and the selected activity, are generated and stored in the asset package; and wherein the obtaining and the packaging operations performed by components of the enhanced implementation of the Reusable Asset Specification 2.2 increase a scope of reusability of the asset.

10. The computer implemented method according to claim 9, further comprising:

packaging into the asset package the particular variability point instance bound with the selected activity and associated with the asset type or the artifact type, wherein the variability point instance comprises an identifier code, when executed by a computer, identify variability point values in an associated artifact of the artifacts and is created when a variability point binding rule of the associated artifact is defined, and wherein meta information on the variability point instance, and a respective binding with the selected activity, are generated and stored in the asset package.

11. The computer implemented method according to claim 9, further comprising:

executing, for an artifact associated with the selected activity, an identifier code of the particular variability point instance associated with the asset type or the artifact type and bound with the selected activity to locate at least one variability point value in the associated artifact, and packaging the at least one variability point value into the asset package, wherein the identifier code of the particular variability point instance is usable for identifying variability point values in the associated artifact and created when a variability point binding rule of the associated artifact is defined; and wherein the meta information for the particular variability point instance, and a respective binding with the selected activity, are generated and stored in the asset package.

12. The computer implemented method according to claim 9, wherein the meta information for parameters of the selected activity is generated and stored in the asset package.

13. The computer implemented method according to claim 9, wherein the meta information for a context for executing the selected activity is generated and stored in the asset package, and wherein the enhanced implementation of the Reusable Asset Specification 2.2 further includes enhancements comprising:

an addition of an ActivityParameter class describing parameters of an activity and including attributes of a name, a description, a defaultValue, and an indication of whether a parameter is required;

an addition of an ActivityContext class to describe a context of the activity and including attributes of an ID, a description, a product, a version, and a richTextdescription, wherein the activities in the asset package perform different operations according to different values provided for the parameters of a respective activity by a user or different consumption contexts; and an addition of a relation between the Activity class and the ActivityContext class, using a ContextExpression class, including an operator attribute, as an enumerator class LogicOperator, having fixed instances including operators: AND, OR, NOT, and parenthesis.

14. The computer implemented method according to claim 9, further comprise:

creating the activity and the specific variability point type for the asset type or the artifact type;

configuring a context for executing the activity created;

configuring associations between the activity created and the specific variability point type, and the asset type or the artifact type; and storing in an activity library the activity created, the specific variability point type, and the meta information associated with the activity created, the context, and the associations between the activity created and the specific variability point type, and the asset type or the artifact type.

15. A computer implemented method for consuming an asset in an enhanced implementation of a Reusable Asset Specification 2.2, comprising:

obtaining an asset package and meta information of the asset package, wherein the asset package uses an ArtifactType class of the enhanced implementation including attributes of name, suffix, and a description, and wherein the suffix is used for identifying an artifact type of the artifacts coming from an asset repository, and contains artifacts and an activity associated with an artifact of the artifacts, the meta information of the asset package includes meta information on the artifacts and the activity in the asset package and an association between an associated artifact and the activity, and wherein the activity comprises execution code for executing asset consumption operations on the associated artifact and related attribute definitions packaged into the asset package; and responsive to obtaining the asset package, automatically executing the activity in the asset package on the associated artifact in the asset package to consume the asset through reading and interpreting the meta information;

wherein a plurality of the activities associated with an asset type of the asset or the artifact type of the artifacts are packaged into the asset package using an association between the ArtifactType class and an Activity class of the enhanced implementation, and wherein the asset package defines consumption steps of the asset, including a dependency and execution order between the plurality of the activities packaged into the asset package, wherein:

the asset package further comprises a variability point instance bound with the activity in the asset package and associated with an artifact, wherein a VariabilityPointType class of the enhanced implementation describes a type of variability point instance, including attributes of an ID, a name, an identifier, a description, and a richTextdescription, and wherein the identifier is a name of an identifier class of a respective variability point type, for finding all values of a particular variability point instance belonging to a specific variability point type from an associated artifact or associated asset and wherein a binding between the Activity class and the VariabilityPointType class, uses a VariabilityPointBindingRule class, of the enhanced implementation including attributes of a ruleName, a variabilityPointTypeID, and a description, and wherein the variability point instance contains an identifier code, when executed, for identifying variability point values in the associated artifact created when a variability point binding rule of the associated artifact is defined;

the meta information of the asset package further includes meta information on the variability point instance and a respective binding with the activity, including information on consumption operations and attributes and associations of the artifacts, activities, and variability point instances; and the method further comprising:
obtaining the variability point values in the associated artifact through executing the identifier code of the variability point instance bound on the associated artifact during executing the activity in the asset package, and providing a selected variability point value to the activity to customize the activity wherein the activity of the asset package performs a different operation in response to different values provided for parameters of the activity by a user or different consumption contexts, thus increasing a scope of reusability of the asset, and wherein the obtaining and the executing operations are performed by components of the enhanced implementation of the Reusable Asset Specification 2.2.

16. A computer implemented method for consuming an asset in an enhanced implementation of a Reusable Asset Specification 2.2, comprising:
obtaining an asset package and meta information of the asset package, wherein the asset package uses an ArtifactType class of the enhanced implementation including attributes of name, suffix, and a description, and wherein the suffix is used for identifying an artifact type of the artifacts coming from an asset repository, and contains artifacts and an activity associated with an artifact of the artifacts, the meta information of the asset package includes meta information on the artifacts and the activity in the asset package and an association between an associated artifact and the activity, and wherein the activity comprises execution code for executing asset consumption operations on the associated artifact and related attribute definitions packaged into the asset package;
responsive to obtaining the asset package, automatically executing the activity in the asset package on an associated artifact in the asset package to consume the asset through reading and interpreting the meta information;
wherein a plurality of the activities associated with an asset type of the asset or the artifact type of the artifacts are packaged into the asset package using an association between the ArtifactType class and an Activity class of the enhanced implementation, and wherein the asset package defines consumption steps of the asset, including a dependency and execution order between the plurality of the activities packaged into the asset package, wherein:
the asset package further comprises variability point values of a variability point instance bound with the activity in the asset package and associated with the associated artifact, wherein a VariabilityPointType class of the enhanced implementation describes a type of variability point instance, including attributes of an ID, a name, an identifier, a description, and a richTextdescription, and wherein the identifier is a name of an identifier class of a respective variability point type, for finding all values of a particular variability point instance belonging to a specific variability point type from an associated artifact or associated asset, and wherein a binding between the Activity class and the VariabilityPointType class, uses a VariabilityPointBindingRule class, of the enhanced implementation including attributes of a ruleName, a variabilityPointTypeID, and a description, and wherein the variability point values are generated by applying on the associated artifact an identifier code of the variability point instance for identifying variability point values in the associated artifact created when a variability point binding rule of the associated artifact is defined;
the meta information of the asset package further includes the meta information on the variability point instance and a respective binding with the activity; and
the method further comprising:
providing a variability point value selected from variability point values to the activity in the asset package to customize the activity during executing the activity, wherein the activity of the asset package performs a different operation in response to different values provided for parameters of the activity by a user or different consumption contexts, thus increasing a scope of reusability of the asset, and wherein the obtaining and the executing operations are performed by components of the enhanced implementation of the Reusable Asset Specification 2.2.

17. The computer implemented method according to claim 15, wherein:
the meta information of the asset package further includes the meta information on the parameters of the activity in the asset package; and
the method further comprising:
receiving values specified for the parameters of the activity in the asset package and passing the values to execution code of the activity during executing the activity to customize the activity, wherein the enhanced implementation of the Reusable Asset Specification 2.2 further includes enhancements comprising:
an addition of an ActivityParameter class describing parameters of an activity and including attributes of a name, a description, a defaultValue, and an indication of whether a parameter is required;
an addition of an ActivityContext class to describe a context of the activity and including attributes of an ID, a description, a product, a version, and a richTextdescription; and
an addition of a relation between the Activity class and the ActivityContext class, using a ContextExpression class, including an operator attribute, as an enumerator class LogicOperator, having fixed instances including operators: AND, OR, NOT, and parenthesis.

18. The computer implemented method according to claim 15, wherein the meta information of the asset package further includes the meta information on the context for executing the activity in the asset package, and the method further comprising:
obtaining a current context of the asset consumption;
determining whether the current context matches with the context of the activity in the asset package; and
in response to the determination being positive, executing the activity.

19. The computer system according to claim 1, wherein a given activity of the activities is associated with a plurality of the asset type or a plurality of the artifact type.

20. The computer system according to claim 1, wherein the asset package defines consumption steps of the asset, including a dependency and execution order between the plurality of the activities packaged into the asset package.

21. The computer system of claim 5, wherein the obtaining module further obtains from the activity library a configuration file reflecting associations between the asset type or the artifact type and the activity and the specific variability point type.

* * * * *